SIGNAL COMPARER USING KIRCHHOFF NETWORK AND COLLECTOR-INPUT VOLTAGE MAGNITUDE SENSING TRANSISTOR

Filed Oct. 16, 1959

INVENTOR

Henry B. Patterson, Jr.

BY

Burns, Doane, Benedict & Irons

ATTORNEYS 3,038,090

SIGNAL COMPARER USING KIRCHHOFF NETWORK AND COLLECTOR-INPUT VOLTAGE MAGNITUDE SENSING TRANSISTOR

Henry B. Patterson, Jr., Houston, Tex., assignor to Dresser Industries, Inc., Dallas, Tex., a corporation of Delaware Filed Oct. 16, 1959, Ser. No. 846,367
6 Claims. (Cl. 307—88.5)

Figure 1:
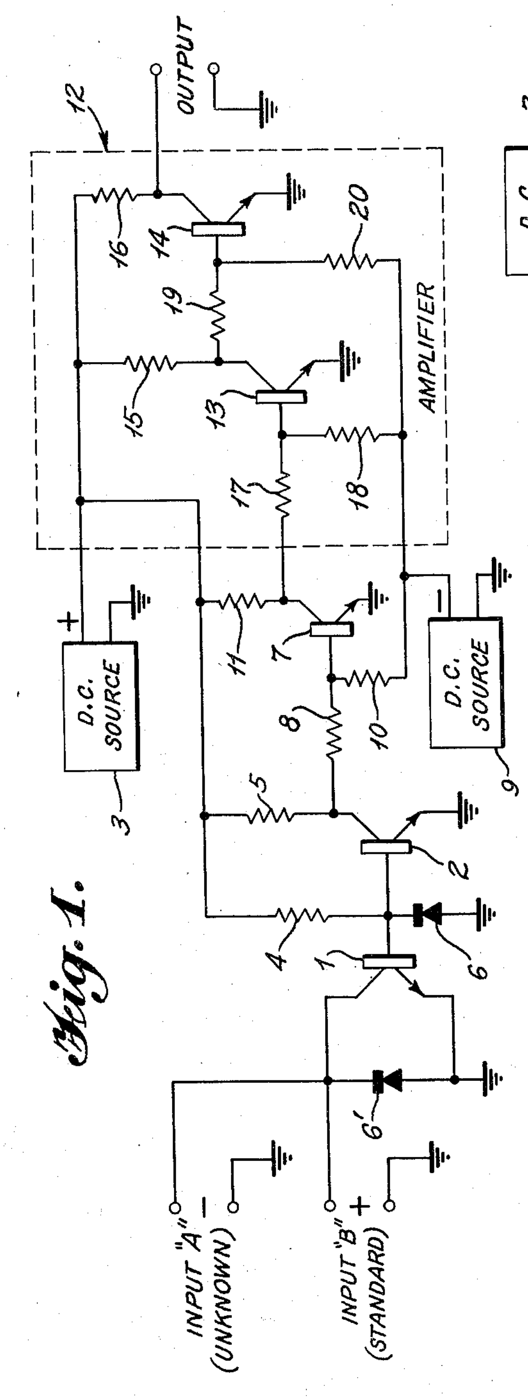

This invention relates to signal comparators, and more particularly to apparatus for comparing voltages or currents to determine which of them is the larger.

For many applications in the electronic arts, it is necessary to obtain an indication of which of two electrical signals is larger. For instance, one known type of analog to digital converter employs sequential comparison of the unknown voltage or current with different standard levels of voltage or current. In this method, it is conventional to develop a digital 1 during each comparison if the unknown voltage is larger than the standard, and to develop a digital 0 if the unknown is smaller than the standard. In the past, comparisons of this type have employed such relatively complicated apparatus as the drift-stabilized D.-C. amplifier of Kaiser et al. Patent No. 2,784,396, the chopper input amplifier of Langevin et al. Patent No. 2,736,006, or the well-known "multiar" circuit. The apparatus of this invention is intended to accomplish the required comparison with a much simpler equipment than employed by the prior art. It is, therefore, possible with this invention to furnish a signal comparator for a fraction of the cost of prior known comparators, yet the comparator of this invention is extremely stable in operation, as well as being extremely precise.

The apparatus of the invention employs a pair of junction transistors which have their bases connected together and to a source of D.-C. voltage. The emitters of the transistors are connected to the other side of the source, and the collector of one of the transistors is connected to the same side of the source as the bases, through the usual load resistor. The voltages or currents to be compared are supplied to the collector of the other transistor, in opposite polarity, so that, when one of the signals is larger, the collector current of the input transistor is high and the collector voltage of the output transistor is correspondingly high. However, when the other signal is larger, the collector current of the input transistor substantially cuts off and the collector voltage of the output transistor decreases. This difference in collector voltage obtained at the output transistor may be employed has an indication of which of the signals is larger. For instance, the collector of the output transistor may be connected to the base of a third transistor and, with an appropriate bias circuit, employed to drive the third transistor to cut-off or to saturation, depending upon which of the signals is larger.

The apparatus of the present invention will be described more fully in conjunction with a preferred embodiment thereof disclosed in the accompanying drawings.

Figure 2:
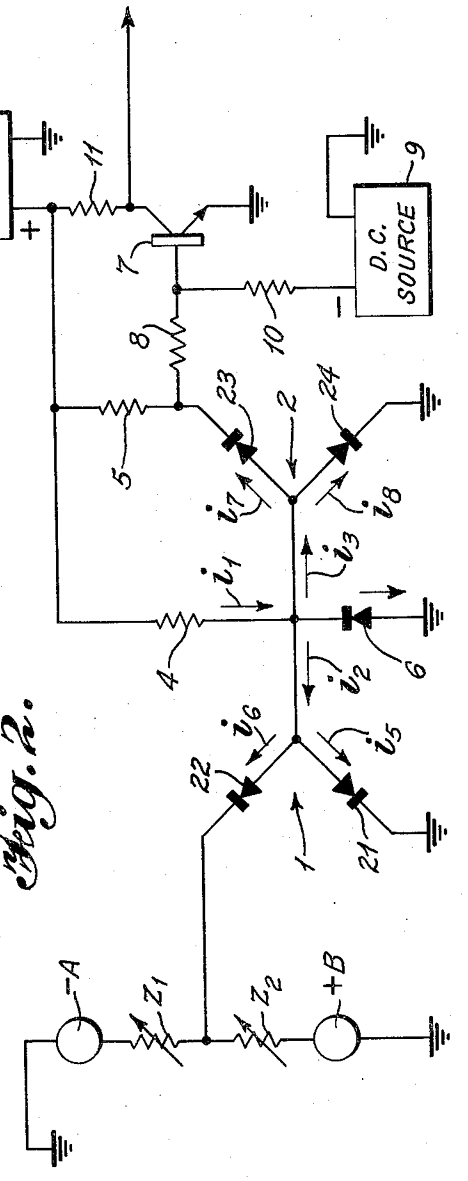

In the drawings,

FIG. 1 is a schematic diagram of the comparator of the invention, combined with an appropriate amplifier; and, FIG. 2 is a schematic diagram of the comparator portion of the apparatus, only, with the comparator transistors shown as their equivalent diodes.

Referring first to FIG. 1, the first input signal identified as unknown "A" is supplied in negative sense between the collector and emitter of an input NPN junction transistor 1. The other signal identified as "B," which may be the standard, is supplied across the same terminals, so that the signals subtract and furnish the collector of input transistor 1 with a voltage (or current) which has the polarity of the larger of the two signals and the magnitude of their difference.

The base of input transistor 1 is directly connected to the base of identical transistor 2, and the emitters of the two transistors are grounded. The bases of the transistors are connected to the positive terminal of a suitable D.-C. source 3 through a very large resistor 4. The negative terminal of the D.-C. source is grounded. The collector of transistor 2 is similarly connected to the positive terminal of the source through a smaller resistor 5.

A semiconductor diode 6 is connected between the bases of transistors 1 and 2 and ground in order to compensate for temperature changes, and a second semiconductor diode 6' is connected between the collector and emitter of transistor 1 in order to protect the transistor against excessive negative voltages that may be supplied to the collector by reason of the unknown input "A" being much larger than the standard input "B."

The collector of transistor 2 is connected to the base of another NPN junction transistor 7 through a relatively small resistor 8, and the base is connected to the negative side of another D.-C. source 9 through a much larger resistor 10. The positive side of source 9 is grounded.

The collector of transistor 7 is connected to the positive side of D.-C. source 3 through a conventional collector resistor 11. The output of the comparator is therefore developed across the collector resistor.

As indicated, the output of the comparator is supplied to an amplifier generally indicated at 12, whose function is to lower the output impedance and increase the power output of the comparator. The amplifier includes a pair of NPN junction transistors 13 and 14 having their emitters grounded and their collectors connected to the positive side of D.-C. source 3 through respective resistors 15 and 16. The base of transistor 13 is connected to the collector of transistor 7 through resistor 17 and to the negative side of source 9 through resistor 18. Similarly, the collector of transistor 13 is connected to the base of transistor 14 through resistor 19, and the base of the latter transistor is connected to the negative side of source 9 through resistor 20. As indicated, the output of the circuit is available between the collector of transistor 14 and ground.

Before the operation of the comparator and amplifier of FIG. 1 is described, the relative values and characteristics of the various components will be indicated by a description of components used in a commercial embodiment of the invention. In that commercial embodiment, transistors 1, 2 and 7 are silicon transistors of the type indentified as 2N336 and the diodes 6 and 6' are of the type identified as HD6001. The resistors 4, 5, 8, 10 and 11 are preferably precision wire-wound resistors.

The voltage of D.-C. source 3 is 10 volts and the voltage of D.-C. source 9 is 20 volts. The magnitudes of the wire-wound resistors are as follows:

| | |
|---|---|
| $R_5$ | Approximately 160,000 ohms. |
| $R_4$ | 1.5 megohms. |
| $R_8$ | 5600 ohms. |
| $R_{10}$ | 560,000 ohms. |
| $R_{11}$ | 100,000 ohms. |

Referring now to FIG. 2, the operation of the comparator will be described. The two inputs have been shown in FIG. 2 as voltage sources of opposite polarities connected in series with variable impedances between them, and with the positive side of source "A" and the negative side of source "B" connected to ground. The variable impedances $Z_1$ and $Z_2$ are merely illustrative of more complicated apparatus that may furnish at the summing point between them, voltages or currents of different magnitudes. The transistor 1 is shown as its component diodes 21 and 22, while the transistor 2 is shown as its component diodes 23 and 24. The remaining elements of the comparator are identical with the corresponding elements of FIG. 1 and are identified by the same reference numerals.

As indicated above, the resistor 4 is very large in magnitude (in the commercial embodiment 1.5 megohms), so that the current $i_1$ remains substantially constant regardless of changes in the input signals. The current $i_1$ splits into and is equal to the sum of current $i_2$ into the base of transistor 1, current $i_3$ into the base of transistor 2, and the reverse current $i_4$ through diode 6. Current $i_2$ is equal to the sum of current $i_5$ through the base-emitter diode 21 and current $i_6$ through the base-collector diode 22. Correspondingly, current $i_3$ is equal to the sum of current $i_7$ through the base-collector diode 23 and current $i_8$ through the base-emitter diode 24.

Assume initially that the voltage at the collector of transistor 1 is negative, indicating that the unknown signal "A" is larger in magnitude than the standard signal "B." The diode 22 will then be forward biased and the current $i_6$ will be relatively large. If, however, the standard signal "B" is larger than the unknown signal "A," the voltage at the collector of transistor 1 will be positive, the diode 22 will be reverse biased, and the current $i_6$ will be negligible. Since the current $i_1$ is constant, as is current $i_4$, the lower current $i_2$ results in a higher current $i_3$. Current $i_7$ therefore increases, decreasing the voltage at the collector of transistor 2. In other words, the collector voltage of transistor 2 is relatively low when the standard signal "B" is larger than the unknown signal "A," while the collector voltage is relatively high when the unknown signal is larger than the standard. This difference in collector voltage is employed to develop the indication as to which of the two signals is the larger.

The indication is obtained by turning the transistor 7 on and off in accordance with which signal is the larger. When the unknown negative signal is larger, the voltage at the collector of transistor 2 is relatively high and the base of transistor 7 is positive. The base-emitter junction of transistor 7 is therefore forward biased and, with the component magnitudes selected, the collector current of transistor 7 is at its saturation level. The collector of transistor 7 is therefore substantially at ground level. However, when the positive standard signal is larger than the negative unknown, the collector of transistor 2 is at a relatively low voltage and the base of transistor 7 is negatively biased. Since the base-emitter junction of the transistor is then reverse biased, negligible collector current flows, and the collector of transistor 7 is at substantially the D.-C. source level. The result is that, when the negative unknown is the larger signal, the collector of transistor 7 is substantially at ground level, while, when the standard signal is larger, the collector is at a relatively high positive voltage.

In the circuit of FIG. 1, the amplifier, including transistors 13 and 14, merely repeats this reversal of conditions, with decreased output impedance and higher output power. The ground level of the collector of the output transistor 14, when the negative signal is the larger, may be used to form a digital 1, while the positive voltage level at the same point, when the standard signal is the larger, may be employed to form a digital 0.

In the commercial embodiment of the invention, the magnitude of resistor 5 was selected to cause the collector of output transistor 14 to be substantially at ground level when the voltage at the collector of input transistor 1 was over −6 millivolts, and to cause the collector of the output transistor 14 to be at +10 volts when the collector of the input transistor 1 was over +6 millivolts. In actual operation of that embodiment, under extreme temperature levels such as −10° C. or +60° C., the output levels referred to are obtained at input transistor collector voltages at least equal to +20 millivolts and −20 millivolts. A plot of the input impedance of that embodiment against voltage at the input indicates that input impedance increases very rapidly from a near zero level at an input of +1 millivolts, as the input is increased in the positive direction.

It will be evident that comparator transistors 1 and 2 operate to temperature compensate each other, since the voltage at the junction of resistor 4 and the bases of the two transistors is determined by the forward conducting properties of the base-emitter diodes of the two transistors. At high temperatures the reverse current through diode 6 compensates for the reverse currents through the base-collector diodes of the fwo transistors.

It will be appreciated that minor modifications could be made in the circuit above described, without departure from the scope of the actual invention. In particular, it is not essential that NPN transistors be employed and other component magnitudes may be used to obtain the same results. Therefore, the invention is not to be considered limited to the preferred embodiment disclosed, but rather only by the scope of the appended claims.

I claim:

1. Apparatus for comparing a pair of electric signals to determine which is the larger, comprising a first and a second junction transistor of the same conductivity type having their bases connected together, a source of D.-C. potential, a first resistor connected between the bases of said transistors and one terminal of said source, a second resistor connected between the collector of the second transistor and said one terminal, the emitters of said transistors being connected to the other terminal of the source, and means for connecting the two signals in opposite polarity between the collector of the first transistor and said other terminal, the output of the apparatus being available across said second resistor and being a voltage having one magnitude when one signal is the larger and another magnitude when the other signal is the larger.

2. The apparatus of claim 1 including a semi-conductor diode connected between the bases of said transistors and said other terminal and connected to present a high impedance to current flow between the terminals of said source therethrough.

3. The apparatus of claim 2 including a second semiconductor diode connected between emitter and collector of said first transistor.

4. Apparatus for comparing a pair of electric signals to determine which is the larger comprising three junction transistors of the same conductivity type, a source of D.-C. potential having a positive and a negative terminal and a common terminal, a first resistor connected between one of said positive and negative terminals and the bases of first and second ones of said transistors, second and third resistors connected respectively between said one terminal and the collectors of the second and third transistors, the emitters of each of said transistors being connected to said common terminal, fourth and fifth resistors connected between the collector of said second transistor and the other of said positive and negative terminals, the junction between said fourth and fifth resistors being connected to the base of said third transistor, and means for connecting the two signals in opposite polarity between the collector and emitter of said first transistor, the output of the apparatus being available between the collector and emitter of said third transistor and being a voltage having one magnitude when one signal is the larger and another magnitude when the other signal is the larger.

5. Apparatus for comparing a pair of electric signals to determine which is the larger, comprising three NPN junction transistors, a source of D.-C. potential having a positive and a negative terminal and a common terminal, a first resistor connected between said positive terminal and the bases of first and second ones of said transistors, second and third resistors connected respectively between said positive terminal and the collectors of the second and third transistors, the emitters of each of said transistors being connected to said common terminal, fourth and fifth resistors connected between the collector of said second transistor and said negative terminal, the junction between said fourth and fifth resistors being connected to the base of said third transistor, and means for connecting the two signals in opposite polarity between the collector and emitter of said first transistor, the output of the apparatus being available between the collector and emitter of said third transistor and being a voltage having a relatively large value when the negative one of said signals is larger and having a relatively small value when the positive one of said signals is larger.

6. The apparatus of claim 5 including a pair of semiconductor diodes connected respectively between the collector and emitter of said first transistor and between the bases and emitters of said first and second transistors, said first diode being operable to shunt high currents around said first transistor when the negative signal is much larger than the positive signal, and said second diode being operable to compensate said first and second transistors against temperature changes.

References Cited in the file of this patent

UNITED STATES PATENTS

| | | |
|---|---|---|
| 2,809,339 | Guggi | Oct. 8, 1957 |
| 2,927,967 | Edson | Mar. 8, 1960 |
| 2,965,833 | Jensen | Dec. 20, 1960 |
| 2,971,099 | Rosenberg et al. | Feb. 7, 1961 |

OTHER REFERENCES

Department of the Army Technical Manual TM11-690, Basic Theory and Application of Transistors, March 1959, pp. 99–100.